US006735340B1

(12) United States Patent
Ohno

(10) Patent No.: US 6,735,340 B1
(45) Date of Patent: May 11, 2004

(54) APPARATUS AND METHOD FOR DECODING DIGITAL IMAGE AND PROVISION MEDIUM

(75) Inventor: Takeshi Ohno, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/288,829

(22) Filed: Apr. 8, 1999

(30) Foreign Application Priority Data

Apr. 9, 1998 (JP) .......................................... P10-097039

(51) Int. Cl.⁷ ................................................. G06K 9/36
(52) U.S. Cl. ........................ 382/238; 382/233; 382/236
(58) Field of Search ................................ 382/233, 236, 382/238; 348/699, 716, 720, 721; 375/240.14, 240.16; 345/547, 531; 709/247

(56) References Cited

U.S. PATENT DOCUMENTS

| | | | | |
|---|---|---|---|---|
| 5,412,430 A | * | 5/1995 | Nagata ........................ | 348/402 |
| 5,550,847 A | * | 8/1996 | Zhu ............................. | 371/32 |
| 5,557,332 A | * | 9/1996 | Koyanagi et al. ............ | 398/416 |
| 5,576,765 A | * | 11/1996 | Cheney et al. .......... | 348/407 Q |
| 5,627,601 A | * | 5/1997 | Ran et al. .................... | 348/699 |
| 5,644,361 A | * | 7/1997 | Ran et al. .................... | 348/416 |
| 5,768,537 A | * | 6/1998 | Butter et al. ................ | 709/247 |
| 5,870,146 A | * | 2/1999 | Zhu ............................. | 178/405 |
| 6,002,802 A | * | 12/1999 | Chujoh et al. .............. | 382/236 |
| 6,075,619 A | * | 6/2000 | Iizuka ......................... | 358/432 |
| 6,104,434 A | * | 8/2000 | Nakagawa et al. ......... | 348/403 |
| 6,125,140 A | * | 9/2000 | Wilkinson .................. | 375/240 |
| 6,160,920 A | * | 12/2000 | Shyu .......................... | 382/250 |
| 6,215,822 B1 | * | 4/2001 | Bose et al. ............ | 375/240.16 |
| 6,243,421 B1 | * | 6/2001 | Nakajima et al. ...... | 375/240.25 |

OTHER PUBLICATIONS

Gonzales et al., "Motion Video Adaptive Quantization in the Transform Domain", IEEE, Transactions on Circuits and Systems for Video Tehcnology, vol. 1, No. 4, Dec. 1991, pp. 374–378.*

* cited by examiner

*Primary Examiner*—Anh Hong Do
(74) *Attorney, Agent, or Firm*—Lerner, David, Littenberg, Krumholz & Mentlik, LLP

(57) ABSTRACT

A digital image decoding apparatus and method designed to improve the efficiency of use of the bandwidth of the frame memory. A motion compensation buffer memory is formed in one integrated circuit together with a motion compensation prediction section. Groups of data items forming macroblocks in image data of a region probable to be referred to are transferred one after another from the motion compensation buffer memory. Groups of data items corresponding to image lines are transferred one after another from a frame memory to the motion compensation buffer memory.

7 Claims, 9 Drawing Sheets

APPARATUS AND METHOD FOR DECODING DIGITAL IMAGE AND PROVISION MEDIUM

BACKGROUND OF THE INVENTION

1. Field of the Invention

The present invention relates to an apparatus and method for decoding a digital image and to a provision medium. More particularly, the present invention relates to an apparatus and method arranged so that the efficiency of use of the bandwidth of a frame memory is improved and to a provision medium for storing a program for carrying out a process specific to the apparatus and method.

2. Description of the Related Art

FIG. 9 shows the configuration of an example of a conventional digital image decoder using the MPEG2 (Moving Picture Experts Group 2) system. When image data which has been encoded and compressed by the MPEG2 system is input to a first-in/first-out (FIFO) section 71 of an integrated circuit (IC) 70, the FIFO section 71 temporarily stores the image data and thereafter supplies the image data to a variable length decoding section 72.

The variable length decoding section 72 performs variable length decoding of the data supplied from the FIFO section 71, outputs motion vectors to a motion compensation prediction section 77, outputs quantization steps to a dequantization section 73, and outputs the image data decoded by variable length decoding to the dequantization section 73.

The dequantization section 73 dequantizes the image data supplied from the variable length decoding section 72 based on the quantization steps also supplied from the variable length decoding section 72, and outputs the dequantized data to an inverse discrete cosine transform (DCT) section 74. The data output from the dequantization section 73 is processed by inverse DCT processing in the inverse DCT section 74 to restore the original data. The inverse DCT section 74 rearranges this data until the arrayed state of the data becomes identical to that of data output from the motion compensation prediction section 77 to a computing device 75. The inverse DCT section 74 outputs the rearranged data to the computing device 75.

In an intra-mode (in-frame processing mode), the image data processed by the inverse DCT section 74 is directly output as decoded image data.

In a motion compensation prediction mode, the motion compensation prediction section 77 computes predicted values by using motion vectors supplied from the variable length decoding section 72 and reference images stored in a frame memory 76 externally attached to the IC 70. The computing device adds together image data (differential data) supplied from the inverse DCT section 74 and predicted values supplied from the motion compensation prediction section 77 to obtain decoded image data, and outputs this decoded image data.

However, when in the thus-arranged processor motion compensated predicted values of a macroblock (16×16 pixels) are obtained, it is necessary for the motion compensation prediction section 77 to read out 17×17 pixel image data as reference image data (not line-unit data but block-unit data) from the frame memory 76 with respect to each of the forward and backward directions, as described below. Therefore, it is necessary for the motion compensation prediction section 77 to frequently change the read address of the frame memory 76 provided outside the IC 70, so that fast reading cannot be achieved. Ordinarily, a wait time occurs at the time of changing the frame memory read address (row address), and the access time is increased due to frequent change of the read address.

Since the motion compensation prediction section 77 cannot read out reference image data during the wait time, the efficiency of use of the bandwidth is disadvantageously low.

SUMMARY OF THE INVENTION

In view of the above-described circumstances, an object of the present invention to provide a digital image decoding apparatus and method designed to improve the efficiency of use of the bandwidth of the frame memory.

To achieve this object, according to one aspect of the present invention, there is provided a digital image decoding apparatus comprising decoding means for decoding input image data, dequantization means for dequantizing image data supplied from the decoding means, transform means for transforming data supplied from the dequantization means, first storage means for storing reference image data, motion compensation prediction means for computing motion compensated predicted values by exerting motion vectors on the reference image data, computation means for computing the reference image data by adding together image data output from the transform means and predicted values output from the motion compensation prediction means, and second storage means for storing, of the reference image data stored in the first storage means, an extent of image data probable to be referred to by the motion compensation prediction means, and for supplying the stored data to the motion compensation prediction means.

According to another aspect of the present invention, there is provided a digital image decoding method comprising a decoding step of decoding input image data, a dequantization step of dequantizing image data supplied from the decoding step, a transform step of transforming data supplied from the dequantization step, a first storage step of storing reference image data, a motion compensation prediction step of computing motion compensated predicted values by exerting motion vectors on the reference image data, a computation step of computing the reference image data by adding together image data output from the transform step and predicted values output from the motion compensation prediction step, a second storage step of storing, of the reference image data stored in the first storage step, an extent of image data probable to be referred to in the motion compensation prediction step, and a transfer step of transferring the image data stored in the second storage step to compute the motion compensated predicted values.

According to still another object of the present invention, there is provided a provision medium having a program stored thereon and used to provide the program to a digital image decoding apparatus, the digital image decoding apparatus being operated in accordance with the program to execute a process including a decoding step of decoding input image data, a dequantization step of dequantizing image data supplied from the decoding step, a transform step of transforming data supplied from the dequantization step, a first storage step of storing reference image data, a motion compensation prediction step of computing motion compensated predicted values by exerting motion vectors on the reference image data, a computation step of computing the reference image data by adding together image data output from the transform step and predicted values output from the motion compensation prediction step, a second storage step of storing, of the reference image data stored in the first storage step, an extent of image data probable to be referred to in the motion compensation prediction step, and a transfer step of transferring the image data stored in the second storage step to compute the motion compensated predicted values.

In the above-described digital image decoding apparatus, the decoding means decodes input image data; the dequantization means dequantizes image data supplied from the decoding means; the transform means transforms data supplied from the dequantization means; the first storage means stores reference image data; the motion compensation prediction means computes motion compensated predicted values by exerting motion vectors on the reference image data; the computation means computes the reference image data by adding together image data output from the transform means and predicted values output from the motion compensation prediction means, and the second storage means stores, of the reference image data stored in the first storage means, an extent of image data probable to be referred to by the motion compensation prediction means, and for supplying the stored data to the motion compensation prediction means.

According to the above-described digital image decoding method and provision medium, input image data is decoded in the decoding step; image data supplied from the decoding step is dequantized in the dequantization step; data supplied from the dequantization step is transformed in the transform step; reference image data is stored in the first storage step; motion compensated predicted values are computed by exerting motion vectors on the reference image data in the motion compensation prediction step; the reference image data is computed in the computation step by adding together image data output from the transform step and predicted values output from the motion compensation prediction step; of the reference image data stored in the first storage step, an extent of image data probable to be referred to in the motion compensation prediction step is stored in the second storage step; and the image data stored in the second storage step is transferred in the transfer step to compute the motion compensated predicted values.

DESCRIPTION OF THE PREFERRED EMBODIMENT

An embodiment of the present invention will be described below in detail with reference to the accompanying drawings.

Figure 1:
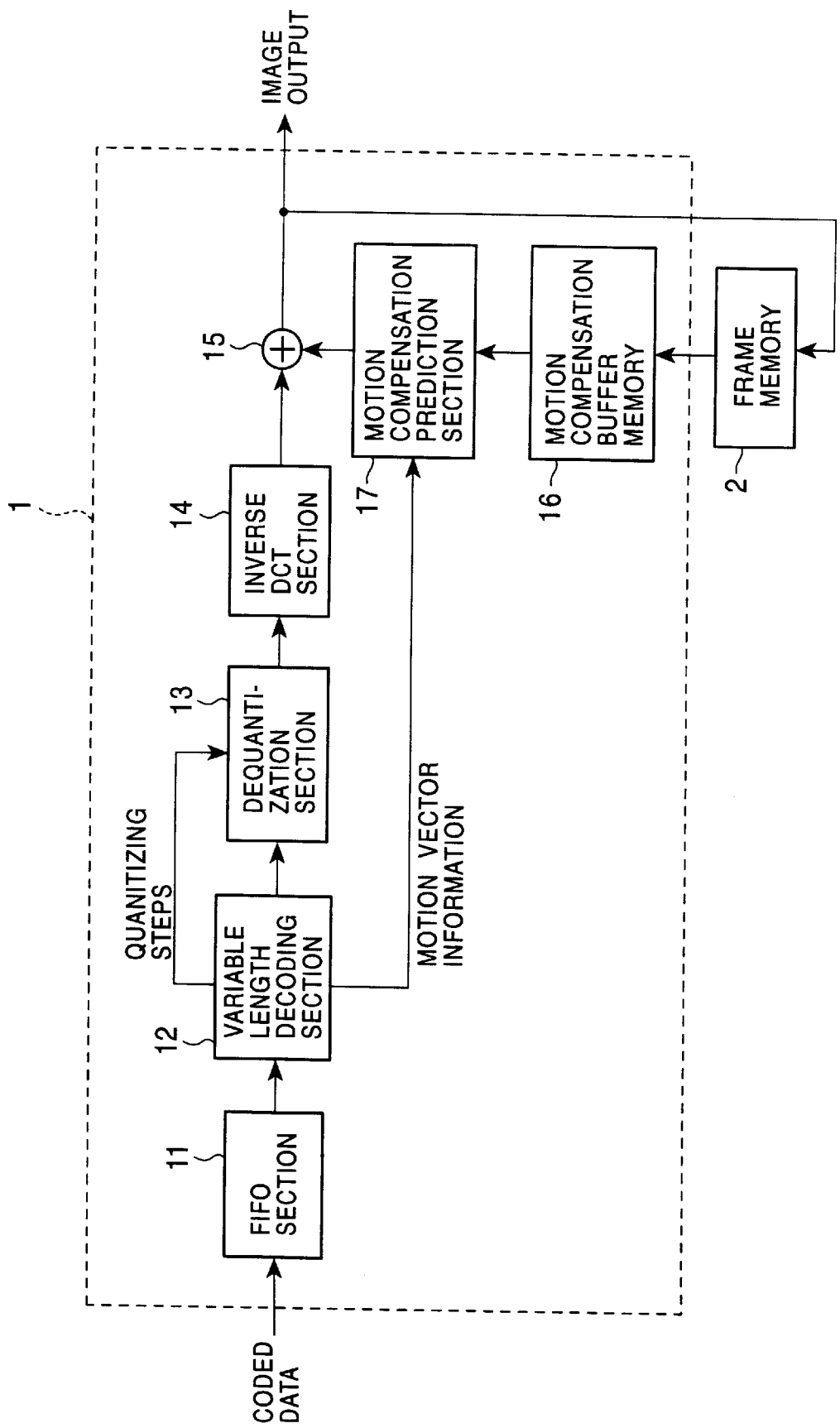
FIG. 1 is a block diagram showing the configuration of a digital image decoding apparatus which represents an embodiment of the present invention.

Referring to FIG. 1, a digital image decoding apparatus which represents an embodiment of the present invention is formed by an IC 1 and a frame memory 2 externally attached to the IC 1. The IC 1 has a FIFO section 11, a variable length decoding section 12, a dequantization section 13, an inverse DCT section 14, a computing device 15, a motion compensation buffer memory 16, and a motion compensation prediction section 17.

When image data which has been encoded and compressed by the MPEG2 system is input to the FIFO section 11, the FIFO section 11 temporarily stores the image data and thereafter supplies the image data to the variable length decoding section 12.

The variable length decoding section 12 performs variable length decoding of the data supplied from the FIFO section 11, outputs motion vectors to the motion compensation prediction section 17, outputs quantization steps to the dequantization section 13, and outputs the image data decoded by variable length decoding to the dequantization section 13.

The dequantization section 13 dequantizes the image data supplied from the variable length decoding section 12 based on the quantization steps also supplied from the variable length decoding section 12, and outputs the dequantized data to the DCT section 14. The data (DCT coefficients) output from the dequantization section 13 is processed by inverse DCT processing in the inverse DCT section 14 to restore the original data. The inverse DCT section 14 rearranges this data until the arrayed state of the data becomes (a line-scan arrayed state) identical to that of data (predicted values) output from the motion compensation prediction section 17 to the computing device 15. The inverse DCT section 14 outputs the rearranged data to the computing device 15.

Figure 2:
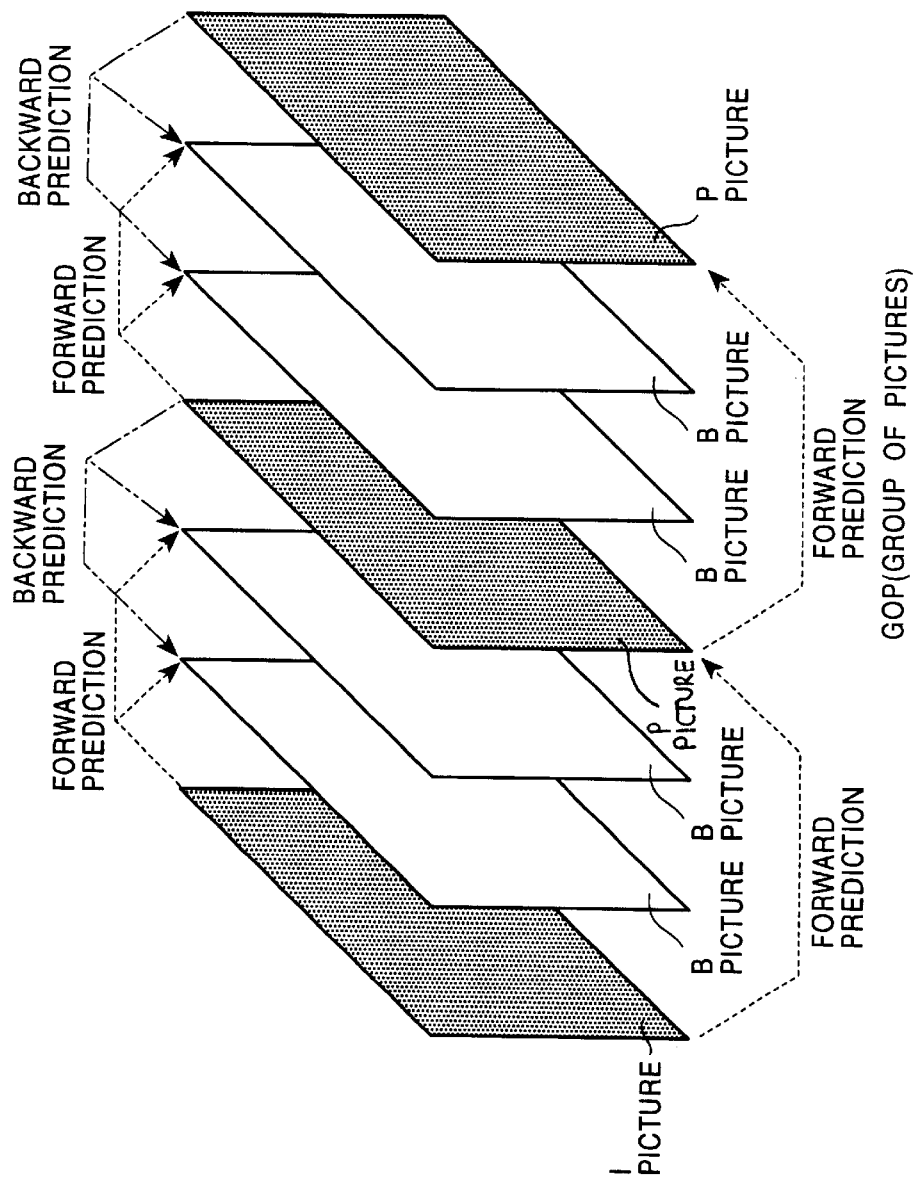
FIG. 2 is a diagram for explaining a group of pictures.

It is assumed here that the group of pictures (GOP) processed in this apparatus has been coded in the order of I, B, B, P, B, B, and P pictures, as shown in FIG. 2.

When image data output from the inverse DCT section 14 is I picture data, it is output through the computing device 15 to be supplied to and stored in the frame memory 2 as reference image data for forming predicted image data from image data (P picture or B picture data) input to the computing device 15 after the I picture data.

When image data output from the inverse DCT section 14 is P picture data which is formed from image data (I picture) supplied three frames ahead of it, and which is forward prediction mode data, the three-frames-ahead reference image data (I picture data) stored in the frame memory 2 is read out through the motion compensation buffer memory 16, and undergoes motion compensation in the motion compensation prediction section 17 according to motion vectors output from the variable length decoding section 12 to be obtained as predicted image data. The computing device 15 adds together this predicted image data and the image data (differential data) supplied from the inverse DCT section 14, and outputs the added data. This added data, i.e., decoded P picture data, is supplied to and stored in the frame memory 2 as reference image data for forming predicted image data from image data (P picture or B picture data) thereafter input to the computing device 15.

When image data output from the inverse DCT section 14 is B picture data, two frames of I picture reference image data and P picture reference image data stored in the frame memory 2 are read out through the motion compensation buffer memory 16 and processed for motion compensation in the motion compensation prediction section 17 to generate predicted image data. The computing device 15 adds together this predicted image data and the image data supplied from the inverse DCT section 14 and outputs the added data.

FIG. 2 is a diagram for explaining an example of the GOP. As shown in FIG. 2, the GOP is formed of three sorts of pictures: I, P, and B pictures. An I picture is a picture coded by DCT in a frame. To form a P picture, motion compensation prediction is performed by using, as a reference picture, an I or P picture decoded previously with respect to time. To form a B picture, bidirectional motion compensation prediction is performed by using, as a reference pictures, I or P pictures positioned before and after the B picture with respect to time.

Figure 3:
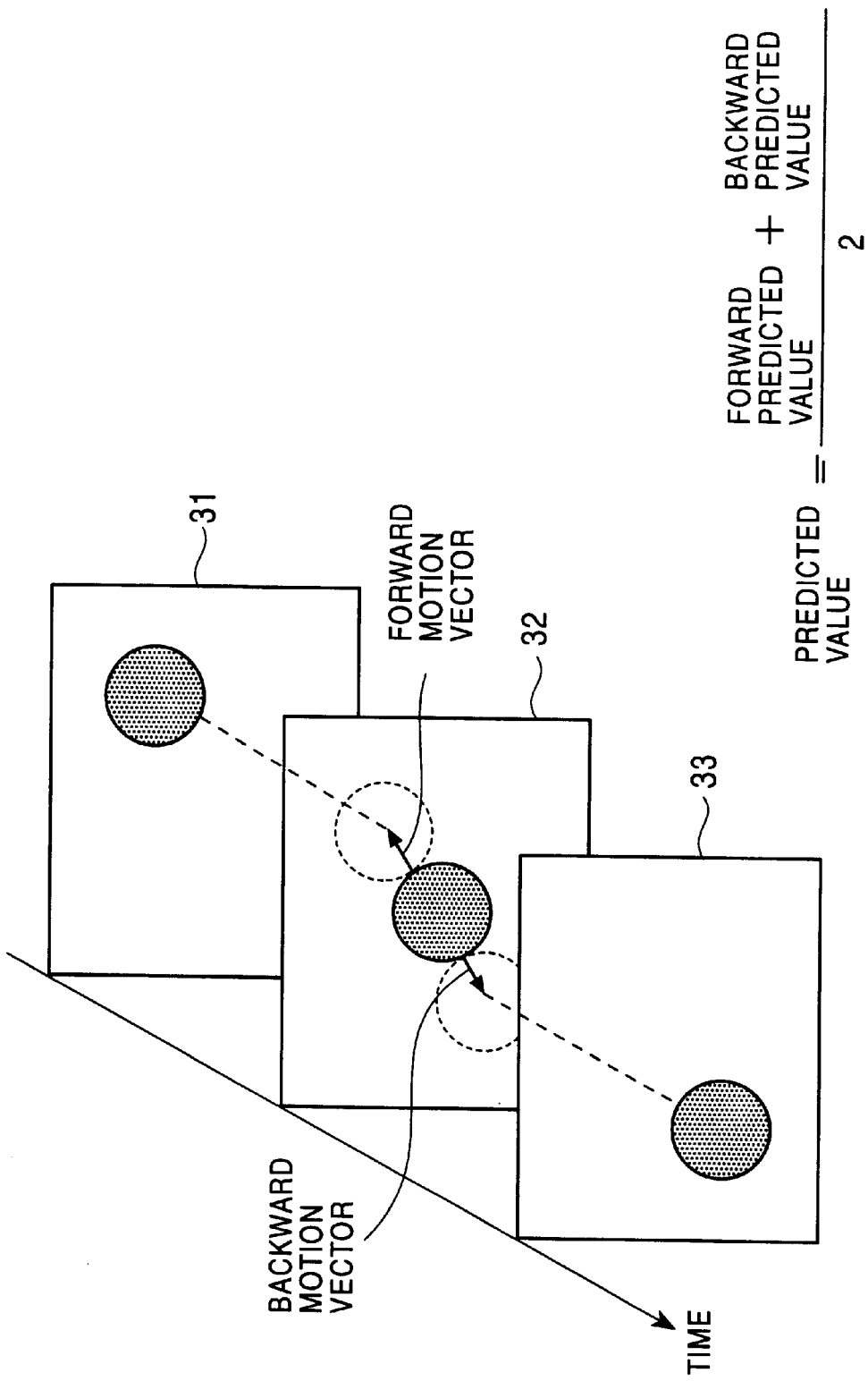
FIG. 3 is a diagram for explaining a method of computing motion compensated predicted values.

A method of computing predicted values in the motion compensation prediction section 17 will now be described with reference to FIGS. 3 to 5. As shown in FIG. 3, motion compensation prediction is performed in the forward or backward direction from an I or P picture positioned before or after a decoded picture, or in the forward and backward directions from I and P pictures or P pictures positioned before and after the decoded picture. The motion compensation prediction section 17 computes predicted values of pixels of a decoded macroblock (16×16 pixels) in a decoded picture 32 based on the position of the macroblock and reference image data (forward-prediction reference picture 31 and backward-prediction reference picture 33) at positions determined with motion vectors with respect to the macroblock.

Figure 4:
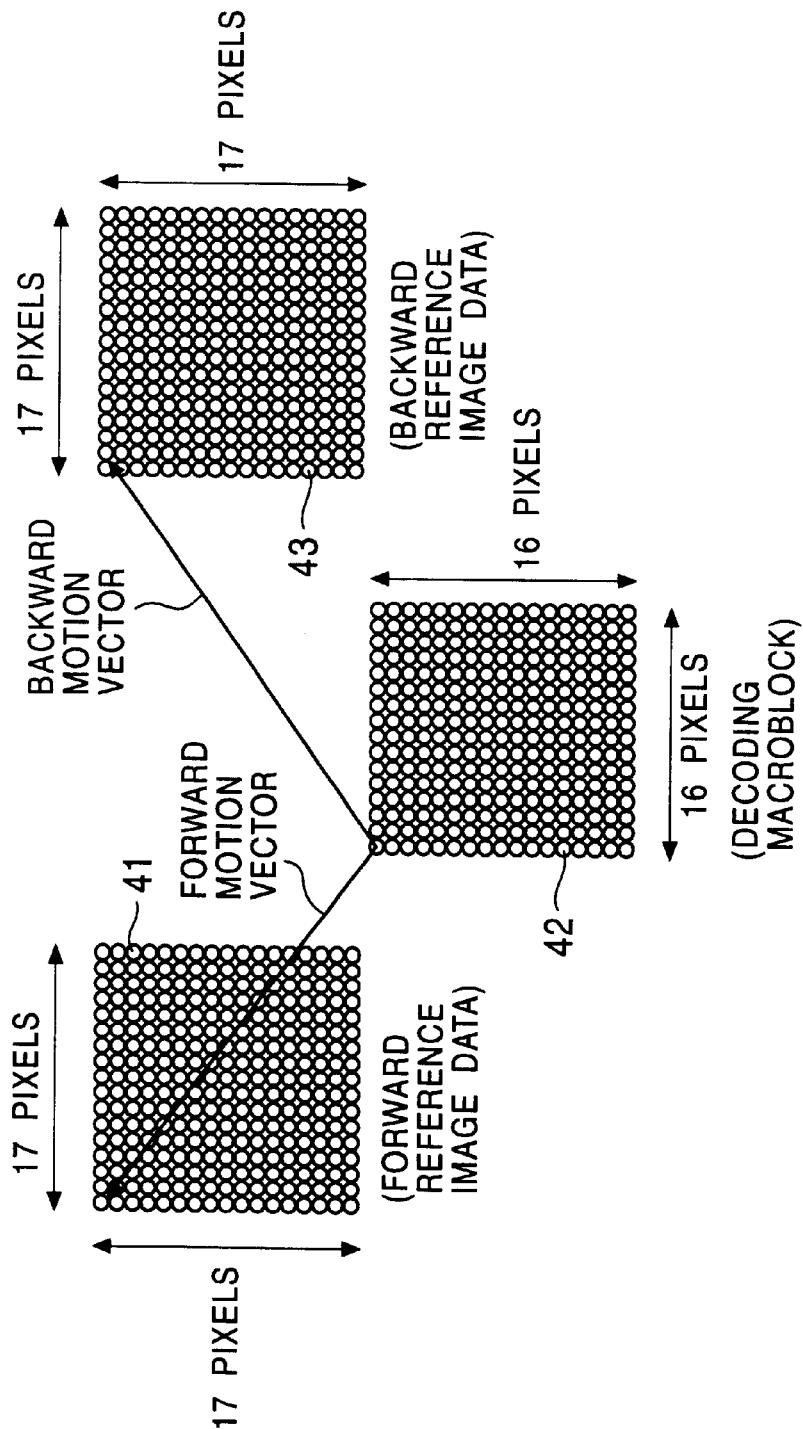
FIG. 4 is a diagram for explaining a macroblock and reference image data.

FIG. 4 is a diagram for explaining motion compensation prediction performed with respect to each of unit macroblocks (16×16 pixels). With respect to each of pixels of a decoded macroblock 42, a reference pixel is determined on each of forward-prediction reference image data 41 (17×17 pixels) and backward-prediction reference image data 43 (17×17 pixels).

Figure 5:
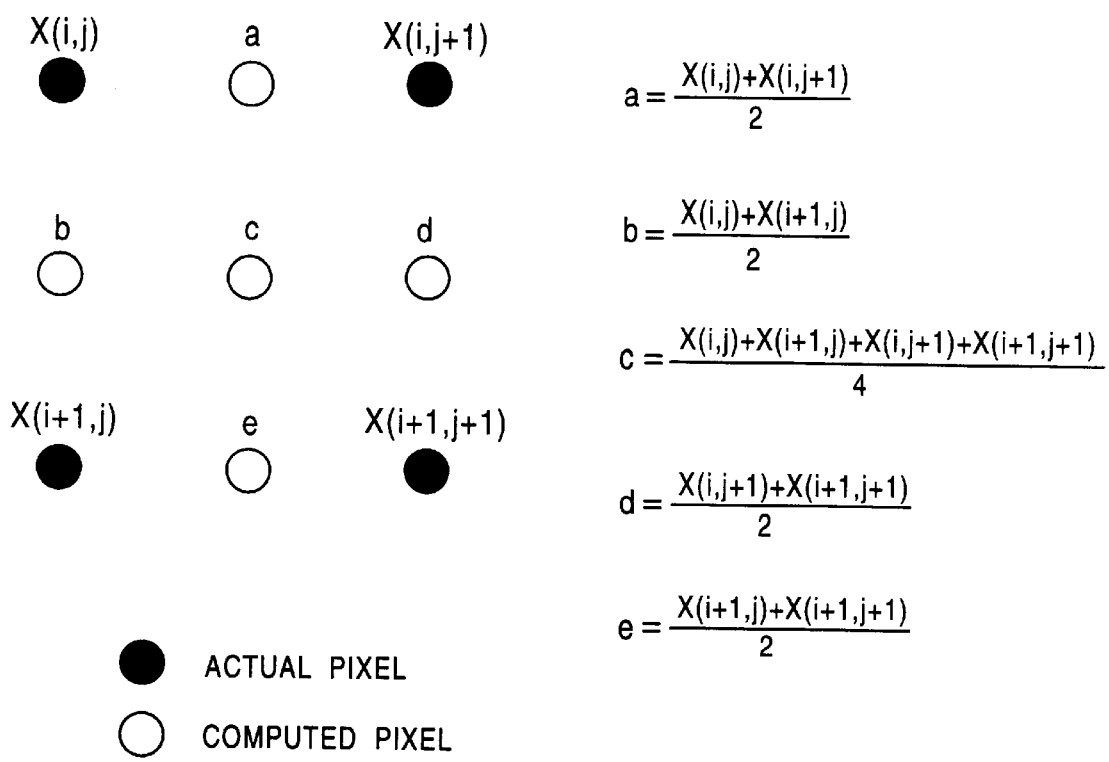
FIG. 5 is a diagram for explaining a method of computing motion compensated predicted values with ½-pixel accuracy.

The motion compensation prediction section 17 performs prediction with ½-pixel accuracy such that one pixel is obtained between each adjacent pair of actual pixels by 1:1 linear interpolation, as shown in FIG. 5. In FIG. 5, four pixels X(i, j), X(i+1, j), X(i, j+1), and X(i+1, j+1), represented by solid round marks, are reference pixels (pixels read out from the frame memory 2), and pixels "a" to "e" are predicted pixels. Each of the values of pixels "a" and "e" is obtained as the average of two adjacent pixels in the horizontal direction, each of the values of pixels "b" and "d" is obtained as the average of two adjacent pixels in the vertical direction, and the value of pixel "c" is obtained as the average of the four pixels. To perform bidirectional motion compensation prediction in the forward and backward direction, therefore, 17×17-pixel reference image data is required in each of the forward and backward directions.

An MP@HL image signal in the MPEG system, corresponding to an image size of 1920 pixels in the horizontal direction and 1088 pixels in the vertical direction, is as described below. The relationship between the luminance signal and the color difference signals of MP@HL image data is 4:2:0, and the number of pixels of the color difference signals is ½ of that of the luminance signal. The range of reference with motion vectors in the horizontal direction is restricted between −1920 and +1920. The range of reference with motion vectors in the vertical direction is restricted between −128 and +127.5 with respect to frame pictures and between −64 and +63.5 with respect to field pictures.

Figure 6:
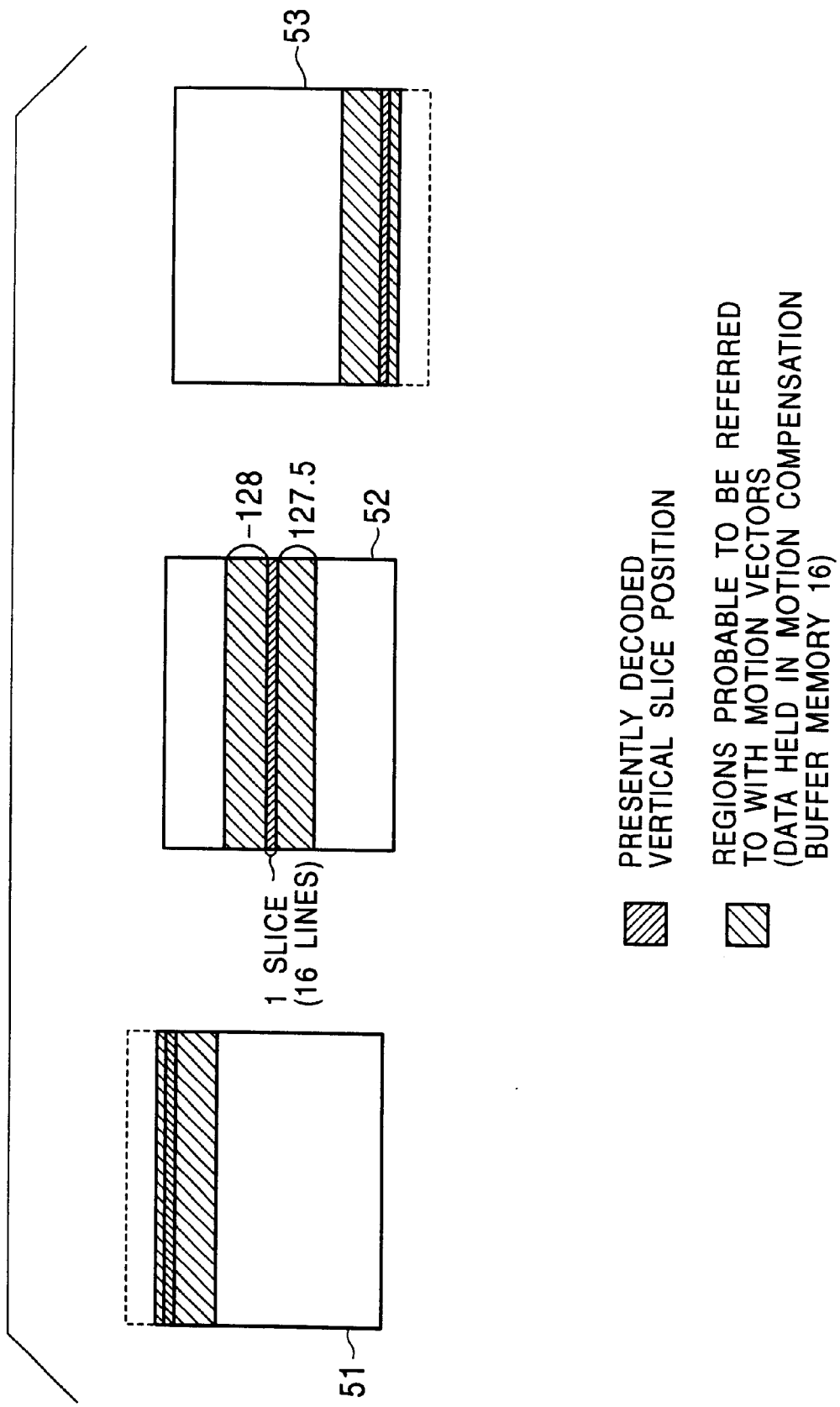
FIG. 6 is a diagram for explaining the vertical-direction position of a decoded macroblock and regions probable to be referred to with motion vectors.

FIG. 6 is a diagram for explaining the relationship between the vertical-direction position of a macroblock currently decoded and regions probably to be referred to with motion vectors at the time of computation of motion compensated predicted values. A state in which decoding of a central one slice (16 lines) in a frame 52 is presently performed is illustrated. Reference regions probable to be referred to with motion vectors are defined between −128 and +127.5 (in terms of the number of lines) about the one slice. That is, image data corresponding to these regions is held by the compensation buffer memory 16. A state in which decoding is performed in the vicinity of the frame top in a frame 51, and a state in which decoding is performed in the vicinity of the frame bottom of a frame 53 are also illustrated. With respect to each of the frames 51 and 53, lines above the uppermost line or lines below the lowermost line are required. However, since no actual lines exit as such lines, the data at the uppermost line or lower most line is held for such lines.

The necessary capacity of the motion compensation buffer memory 16 is as described below. With respect to the luminance signal, the sum of a capacity corresponding to 128 lines in the upper motion vector reference region, a capacity corresponding to 128 lines in the lower motion vector reference region, and a capacity corresponding to 16 lines in the region containing the presently decoded macroblock, i.e., a total capacity corresponding to 272 lines, is required for each of forward prediction and backward prediction. There is also a need to transfer data of 16 lines corresponding to the macroblock size to the motion compensation buffer 16 by considering the time required for data transfer from the frame memory 2 to the motion compensation buffer 16. Consequently, a capacity corresponding to 288 lines is required as the total capacity of the motion compensation buffer memory 16. With respect to each of the two color difference signals, a capacity corresponding to 144 lines, half the capacity corresponding to 288 lines required with respect to the luminance signal, is required.

Figure 7:
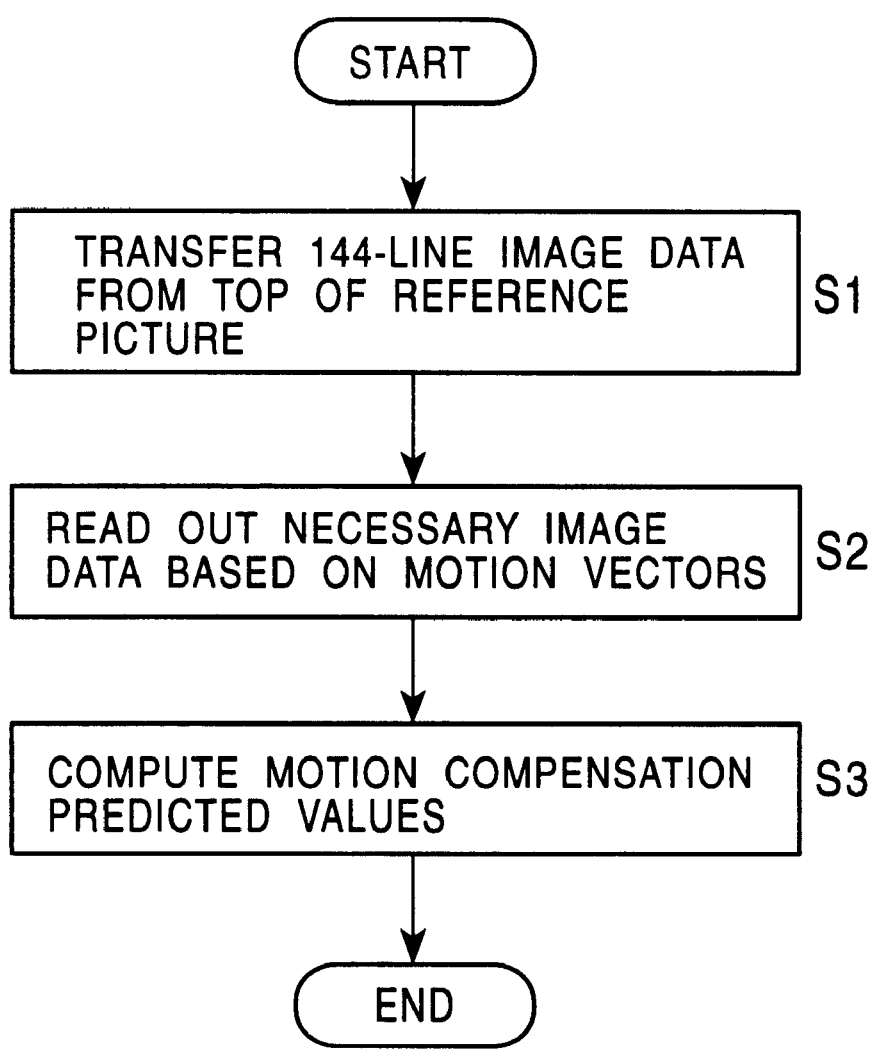
FIG. 7 is a flowchart for explaining the operation for decoding an I picture.

The operation of decoding pictures will next be described with reference to FIGS. 7 and 8. FIG. 7 is a flowchart for explaining the operation when an I picture is decoded. First, in step Si, during a time period (t1, t3 in FIG. 8) in which decoding of the 144th and other subsequent lines (59th and other subsequent slices) as counted from the final line of the preceding picture is performed, unit groups of image data items corresponding to 144 lines from the top of each of forward-prediction and backward-prediction reference pictures are transferred one after another from the frame memory 2 to the motion compensation buffer memory 16. This is because, when decoding of top macroblocks of the picture is started, the region of the reference picture probable to be referred to with motion vectors correspond to 144 lines, i.e., the sum of 16 lines from the top of the reference picture, corresponding to the macroblock size, and 128 lines, corresponding to the downward maximum reference range through which the picture may be referred to with motion vectors.

In step S2, the motion compensation prediction section 17 reads out each of unit groups of data items corresponding to macroblocks (or to 2×2 blocks forming macroblocks) from the motion compensation buffer memory 16, and the process then advances to step S3. In step S3, the motion compensation prediction section 17 computes motion compensated predicted values of each macroblock.

Since the motion compensation buffer memory 16 is formed in the IC 1 in which the motion compensation prediction section 17 is also provided, it can transfer macroblock-unit data at a sufficiently high speed. On the other hand, transfer from the frame memory 2 to the motion compensation buffer memory 16 may be line-unit transfer, which can be performed as high-seed transfer such as burst transfer. Therefore, the efficiency of use of the bandwidth of the frame memory 2 can be improved in comparison with macroblock-unit transfer.

Figure 8:
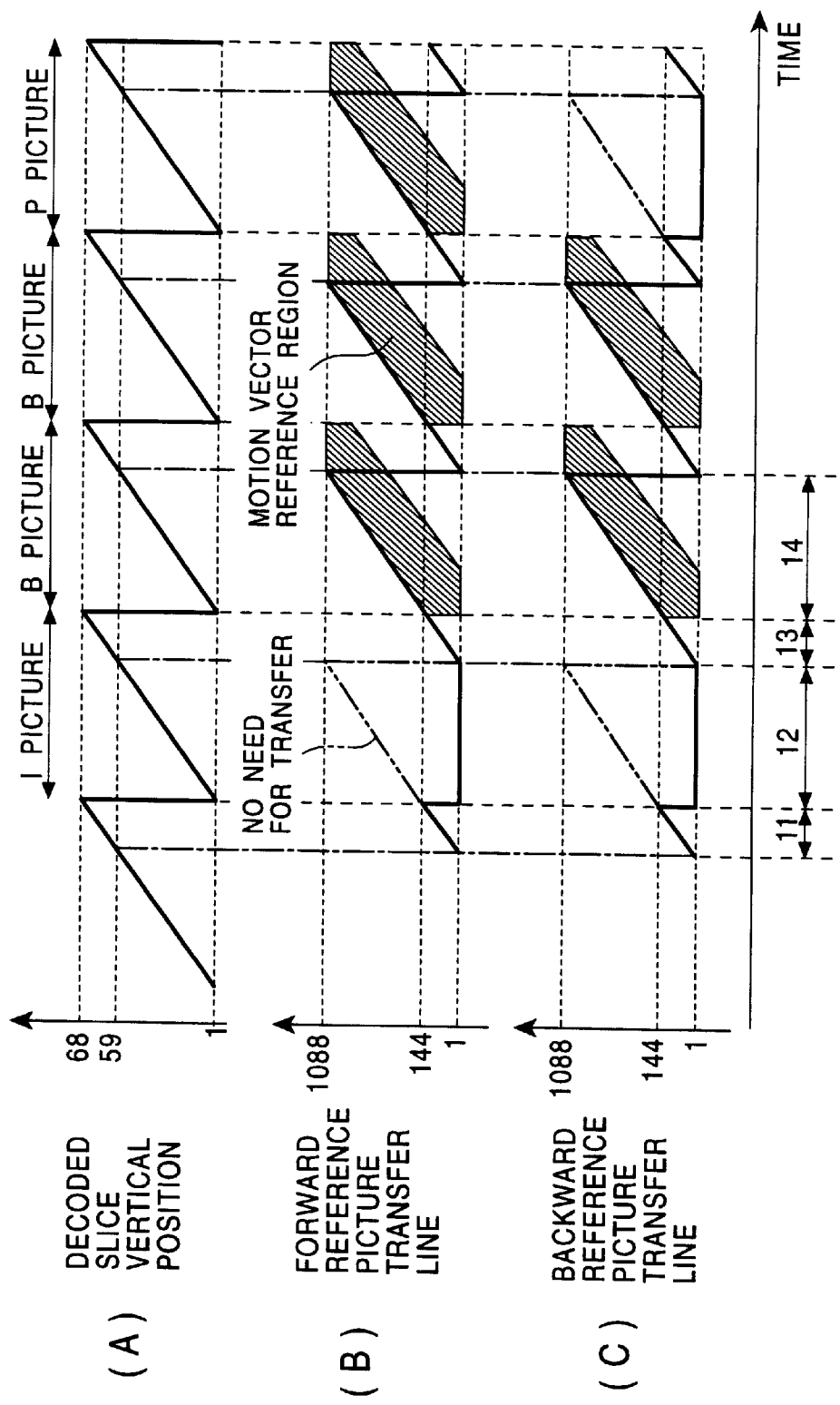
FIG. 8 is a diagram for explaining the relationship between the decoded slice vertical-direction position and image data transfer timing.
Figure 9:
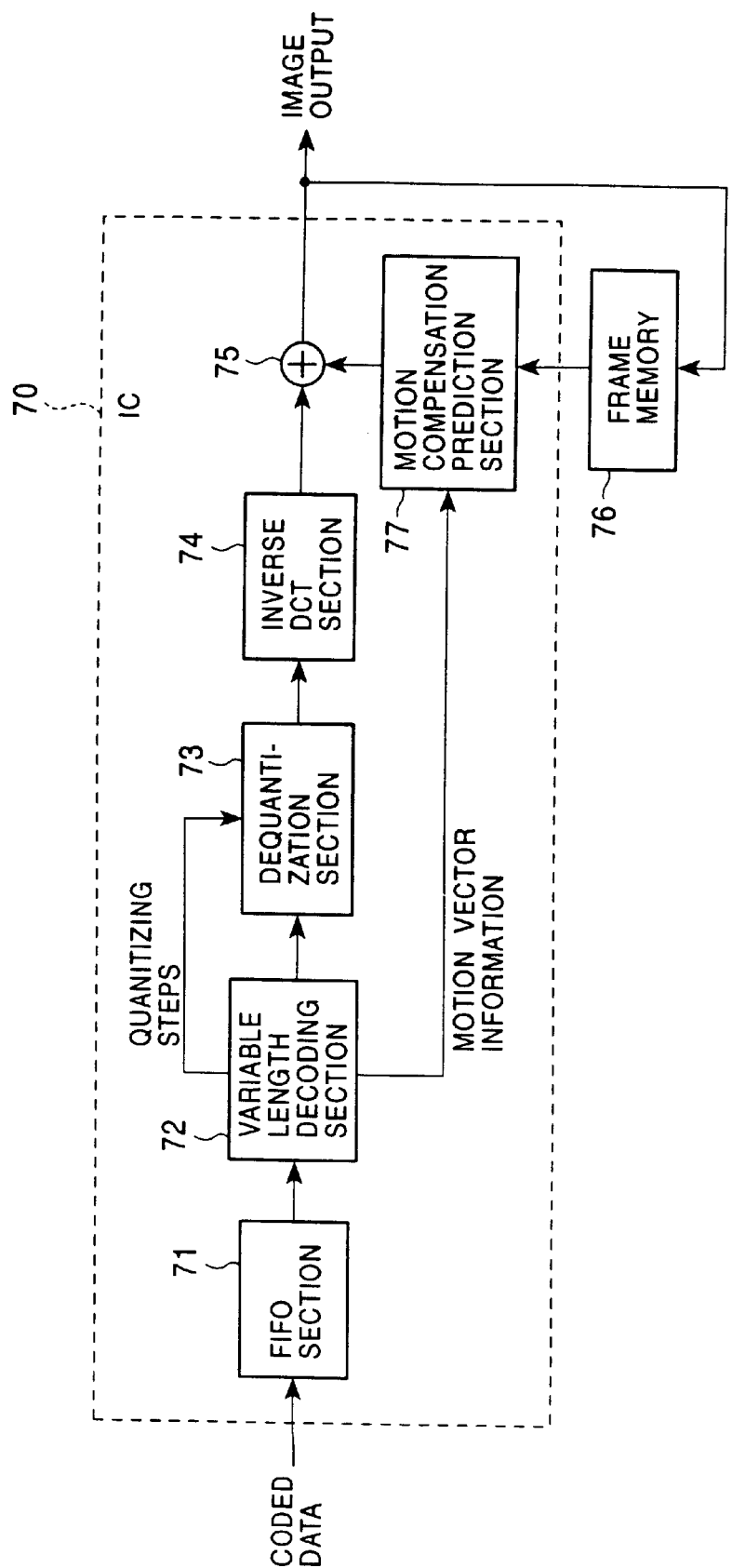
FIG. 9 is a block diagram showing the configuration of a conventional digital image decoding apparatus.

Since there is no need for picture prediction when the I picture is decoded, it is not necessary to newly transfer reference picture data during the period (t2 in FIG. 8) when the I picture is decoded, as shown in FIG. 8. During the period (t3 in FIG. 8) when the 59th and other subsequent slices of the I picture are decoded, image data corresponding to 144 lines from the top of each of the forward-prediction and backward-prediction pictures is transferred from the frame memory 2 to the motion compensation buffer memory 16.

During the period (t4 in FIG. 8) when the first to 59th slices of the B picture are decoded, image data of 144th to 1088th line in reference image data is transferred. Subsequently, the same processing is repeated.

The present invention also comprises a provision medium for providing a user with a computer program for executing the above-described process. Examples of such a provision medium are information recording mediums, such as a magnetic disk and a compact disc read-only memory (CD-ROM), and network transmission mediums, such as the internet and a digital satellite.

According to the present invention, as described above, an extent of image data probable to be referred to at the time of motion compensation prediction is stored separately from reference picture data, thereby improving the efficiency of use of the bandwidth of the reference picture data storage section.

What is claimed is:

1. A digital image decoding apparatus comprising:

decoding means for decoding input image data;

dequantization means for dequantizing image data supplied by said decoding means;

transform means for transforming data supplied by said dequantization means;

first storage means for storing reference image data;

second storage means for storing, of the reference image data stored in said first storage means, an extent of reference image data probable to be exerted on by motion vectors;

motion compensation prediction means for computing motion compensated predicted values by exerting motion vectors supplied by said decoding means on the extent of reference image data supplied by said second storage means; and computation means for computing further reference image data by adding together image data output from said transform means and the motion compensated predicted values output from said motion compensation prediction means.

2. An apparatus according to claim 1, wherein said motion compensation prediction means and said second storage means are integrally formed in an integrated circuit.

3. An apparatus according to claim 1, wherein unit groups of data items respectively corresponding to image lines are transferred one after another from said first storage means to said second storage means, and unit groups of data items respectively corresponding to image blocks are transferred one after another from said second storage means to said motion compensation prediction means.

4. A digital image decoding method comprising:

a decoding step of decoding input image data;

a dequantization step of dequantizing image data supplied by said decoding step;

a transform step of transforming data supplied by said dequantization step;

a first storage step of storing reference image data;

a second storage step of storing, of the reference image data stored by said first storage step, an extent of reference image data probable to be exerted on by motion vectors;

a motion compensation prediction step of computing motion compensated predicted values by exerting motion vectors supplied by said decoding step on the extent of reference image data supplied by said second storage step; and a computation step of computing further reference image data by adding together image data output from said transform step and the motion compensated predicted values supplied by said motion compensation prediction step.

5. A method according to claim 4, wherein said motion compensation prediction step and said second storage step are executed in on integrated circuit.

6. A method according to claim 4, wherein unit groups of data items corresponding to image lines are stored one after another in said second storage step, and unit groups of data items corresponding to image blocks are transferred one after another in said transfer step.

7. A provision medium having a program stored thereon and used to provide the program to make a digital image decoding apparatus execute a process including:

a decoding step of decoding input image data;

a dequantization step of dequantizing image data supplied by said decoding step;

a transform step of transforming data supplied by said dequantization step;

a first storage step of storing reference image data;

a second storage step of storing, of the reference image data stored by said first storage step, an extent of reference image data probable to be exerted on by motion vectors;

a motion compensation prediction step of computing motion compensated predicted values by exerting motion vectors supplied by said decoding step on the extent of reference image data supplied by said second storage step; and a computation step of computing further reference image data by adding together image data output from said transform step and the motion compensated predicted values supplied by said motion compensation prediction step.

* * * * *

UNITED STATES PATENT AND TRADEMARK OFFICE
CERTIFICATE OF CORRECTION

PATENT NO.    : 6,735,340 B1
DATED         : May 11, 2004
INVENTOR(S)   : Takeshi Ohno It is certified that error appears in the above-identified patent and that said Letters Patent is hereby corrected as shown below:

Column 6,
Line 39, "Si" should read -- S1 --.

Signed and Sealed this

Twenty-seventh Day of July, 2004

JON W. DUDAS
*Acting Director of the United States Patent and Trademark Office*